July 12, 1927.
J. D. STASSART
1,635,587
DIRECTION INDICATOR FOR MOTOR TRUCKS AND THE LIKE
Filed June 1, 1925
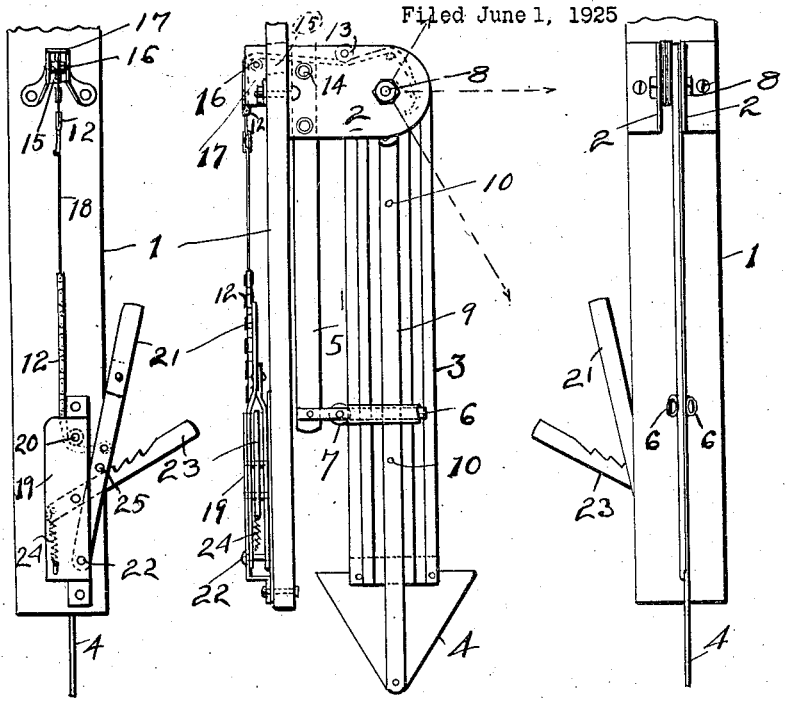
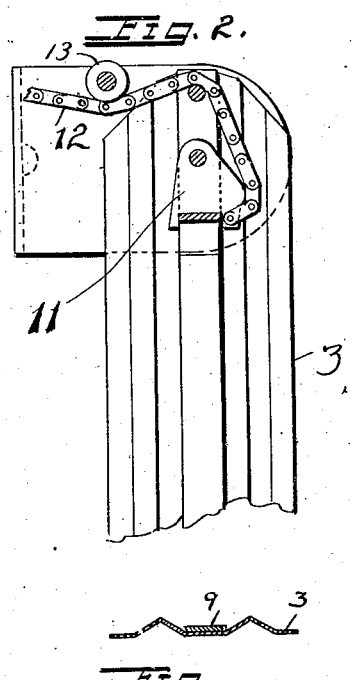
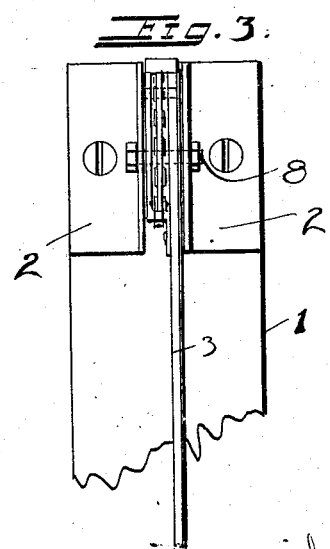
INVENTOR.
Joseph D. Stassart
By Harry C. Schwede
attorney Patented July 12, 1927.

1,635,587

UNITED STATES PATENT OFFICE.

JOSEPH D. STASSART, OF BERKELEY, CALIFORNIA, ASSIGNOR OF ONE-FOURTH TO WILLIAM A. HARTER, OF SAN FRANCISCO, CALIFORNIA.

DIRECTION INDICATOR FOR MOTOR TRUCKS AND THE LIKE.

Application filed June 1, 1925. Serial No. 34,118.

This invention relates to improvements in direction indicators, and has for its object to provide a substantially constructed direction indicator that can be adjusted on the cab of any motor truck and such like, and not requiring any special mechanical ability to properly adjust the same.

One of the objects of the invention is, to provide a device of the character named, wherein through a combination and novel arrangement of the parts, providing a direction indicator made of suitable material that can be easily adjusted to the cab of a motor truck, and be easily seen front and rear, and be operated preferably from the left side of the driver, by hand, and enable him to give the proper signals—such as stop, left and right hand turns, in a very convenient manner, by a lifting and notched lever, causing the blade with its arrow at the end, to stay in the desired position, and thus relieving the driver from an extended arm and hand; and the indicator can be operated from either side of the driver, being so made and arranged that the hand control lever can be on the right hand drive truck and the blade with its arrow still remains and shown on the left side of the truck, by the length of the pulling means, thus providing a cheap and reliable means of giving different signals free from complications of electrically operated signal devices, that are liable to get out of order, and can not always be depended upon, and cost a great deal less.

With these and other advantageous objects in view, the invention consists in the novel and sectionally constructed device as a direction indicator, and the arrangement of the parts to be herein described and illustrated in the accompanying drawings—

Fig. 1 represents the direction indicator as it appears when installed in place, showing the blade with its arrow in a downward position.

Fig. 2 is an abbreviated plan view of Fig. 1, showing the working leverage of the pulling chain fastened to cross strap and up and over the U-shaped plate and over the pin and under the roller.

Fig. 3, is a cross section view of Fig. 2.

Fig. 4, represents an abbreviated front view of Fig. 1, showing how the indicator is arranged on its base board, with the plates bolted to base board that the chain and blade operates between and the hand and notched levers.

Fig. 5, is a back side plan of Fig. 1, showing slot in base board, the bracket over the slot, the chain, the bracket and the notch and hand lever.

Referring more particularly to the drawings—the direction indicator may be made in most parts of sheet metal or other suitable material cut first in several different forms, as shown, and then assembled together, as in Fig. 1, showing the base board No. 1, on which the direction indicator is fastened to, and said base board being a part of the indicator for the purpose of adjusting on the cab of a motor truck in the desired location, metal plates 2—2 at upper end of base board 1, and spaced apart on base board and having a flexible covering to act as a holding and protecting case of the working parts of the indicator. Plates 2—2 as spaced apart acts as guideway and holder of blade, with its arrow 4, as shown in Fig. 1, in a downward position, and made preferably of sheet metal corrugated to stiffen the same.

An extra strip of sheet metal No. 5, fastened at one end to inside of one of the plates 2—2 and extending downward and at its lower end, is fastened, a forked bracket 6, at right angle to strip 5, said bracket 6 is also fastened to base board just back of the end of strip 5, the other end forked and each side arm of said bracket 6 is wrapped with suitable material and acts as a holder of the blade 3, also in said forked bracket 6, near strip 5 is a bumper No. 7, to act as a catch to said blade when blade 3 is at rest between the forks of said bracket 7, while said blade 3 is held suspended between plates 2—2 by means of a pin 8. A U-shaped piece of metal No. 9, is fastened to center part of blade 3 by a pin or bolt between plates 2—2 to strip 10 of said blade 3, and just below U-shaped plate 9 is a horizontally arranged strap 11, said strap 11 having eyelet for the connection of chain 12, which passes up over U-shaped plate 9, and over a pin and in under roller No. 13, and over pin and roller 14 and to and through slot 15, in upper end of base board and over roller pin No. 16, which is arranged in bracket 17, which is fastened to base board on the opposite side from metal plates 2—2, as is plainly shown in Figs. 5 and 1. Chain 12 after bracket 17, may terminate and be fastened to a wire portion No. 18, said wire terminating again and fastened to continuation of chain 12, which centers into bracket 19, which is fastened at lower end of base board 1, and then passing in under roller pin 20, and then fastened to pin about the center of hand lever 21, lever 21 working on pivot pin 22 between the plates of bracket 19. In connection to hand lever 21 is arranged notch lever 23, working on a pivot pin about center of bracket 19, said notched lever 23 connected at its lower end to coil spring 24, which is fastened to lower end of bracket 19, thus giving notched lever 23 an upward force sufficient to hold when caught on notch pin 25 arranged through the divided portions of lever 21; and notched lever 23, also working between the divided portions of lever 21 and in under pin 25, as is shown in Fig. 5. Thus it will be seen that if hand lever 21 is pulled down to first notch in lever 23, it will pull on chain 12, holding signal blade 3 with its arrow 4 in a signal position for stop. Second notch signal position for left hand turn, and 3rd notch for right hand turn, and then back again to resting position between the forks of bracket 6.

Having described my invention and its method of operation, and giving the different signals as indicated by the dotted lines, as shown in Fig. 1, I do not desire to be limited to the construction herein described and set forth, as variation in size and shape may be resorted to, without departing from the spirit of the invention, which provides a simple, safe, economical means for giving the different signals, and which I desire to procure by Letters Patent is—

1. A device of the character indicated, having a baseboard, plates spaced apart, fastened at right angle to said baseboard, a corrugated blade swung on a pin or bolt between said plates, an arrow arranged at opposite end of said blade, a strip lengthwise fastened in center of said blade, a metal strip fastened to the inside of one of said plates, extending parallel and adjacent to baseboard, a bracket fastened to lower end of said strip, said bracket also fastened to base board, said bracket having divided forked prongs, a suitable material on said prongs, said bracket to act as a brace and non-rattling means to said blade; a U-shaped piece of metal of desired thickness and size, fastened to said strip in center of corrugated blade.

2. A device of the character described, having a baseboard, plates spaced apart, fastened at right angle to said baseboard, a corrugated blade swung at one end between said plates, said blade supported by a bolt through said plates, an arrow arranged at opposite end of said blade, a strip longitudinally fastened in center of said blade, a metal strip fastened at one end to inside of one of spaced apart plates and extending parallel and adjacent to baseboard, said strip having opposite to fastened end, a forked bracket at right angle thereto; said bracket fastened to strip and baseboard, a bumper between the forks of said bracket near said strip, rubber tubing on each fork of said bracket, the required distance and in line with supported end of corrugated blade, acting as a brace and non-rattling means to said corrugated blade, a U-shaped piece of metal of desired thickness and size fastened and adjacent to swung end of corrugated blade, an eyed or looped strap fastened in a horizontal position at lower edge of U-shaped plate to strip in center of corrugated blade, a slot in baseboard in line between said spaced apart plates, a bracket fastened to base board on opposite side and in line with said slot and said spaced apart plates, a pin and a roller on said pin in said bracket just below and in line with slot in said base board.

3. In a device of the character described having a base board, plates spaced apart and fastened at right angle to baseboard, a corrugated blade swung at one end between said plates, an arrow arranged at opposite end of said blade, a strip longitudinally fastened in center of said blade, a strip fastened at one end to inside of one spaced apart plate, extending parallel and adjacent to base board, said strip having at opposite end a forked bracket at right angle, said bracket fastened to end of said strip and base board, a bumper in bracket near said strip, rubber tubing on each fork of said bracket, bracket required distance and in line with supported end of said corrugated blade, said bracket acting as a brace and non-rattling means to said corrugated blade, a U-shaped piece of metal of desired thickness and size fastened and adjacent to swung end of corrugated blade, an eyed or looped strap fastened in a horizontal position at lower edge of U-shaped plate, to strip in center of corrugated blade, a slot in baseboard in line between said spaced apart plates, a bracket fastened to base board on opposite side and in line with said slot and said spaced apart plates, a pin and a roller on said pin in said bracket just below and in line with slot in said base board.

4. In a direction indicator of the character described, a suspended signalling element, means for swinging and maintaining the same in any one of several signalling positions, guide members on opposite sides of the said element and a bumper between said guide members adapted to receive the said element when the same swings back into an inactive position.

5. In a direction indicator of the character described, a suspended signalling element, two brackets pivotally supporting the same, a short arm mounted co-axially with the element and between the brackets, a flexible member engaging the end thereof, guide means for the flexible member and means for exerting pull on the flexible member whereby the element may be swung on its pivot.

JOSEPH D. STASSART.